June 21, 1966  G. J. LAURENT  3,257,563
PHOTOSENSITIVE VARIABLE APERTURE SCANNING DEVICE
Filed Oct. 22, 1962  3 Sheets-Sheet 1
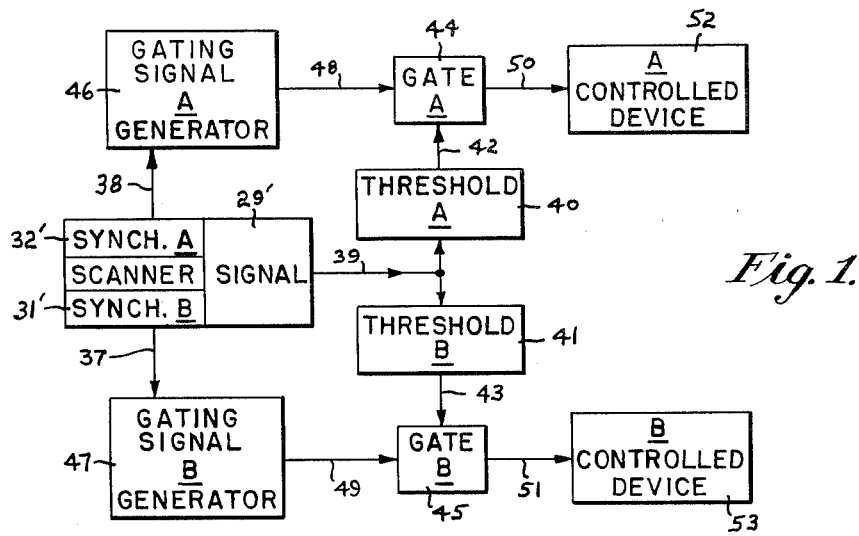
Fig. 1.
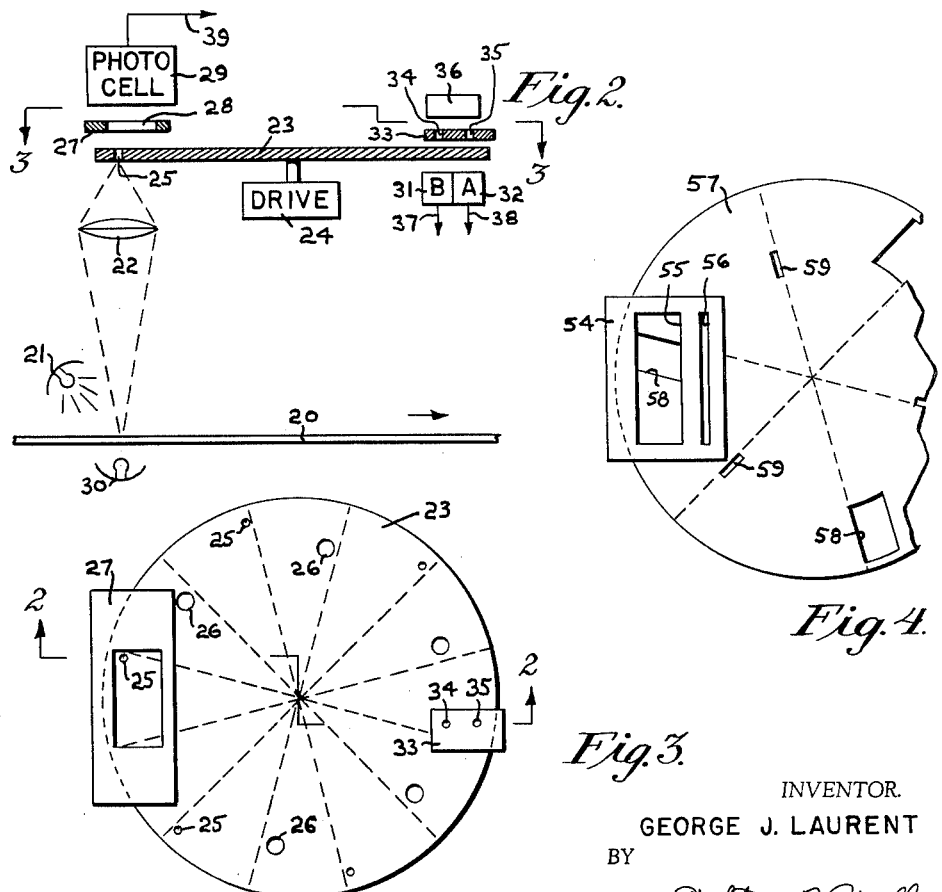
Fig. 2.
Fig. 3.
Fig. 4.
INVENTOR.
GEORGE J. LAURENT
BY
Walter B. Udell
ATTORNEY.

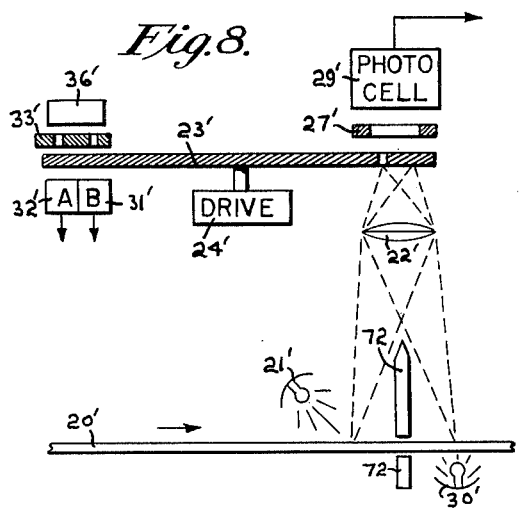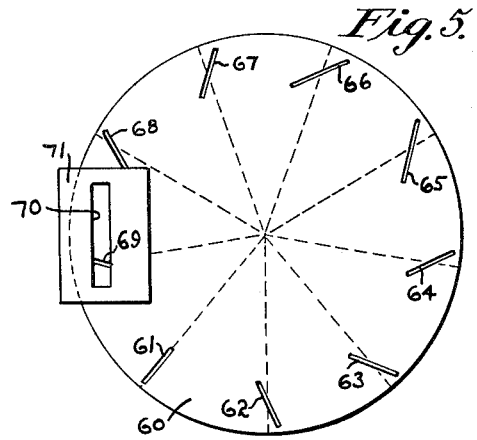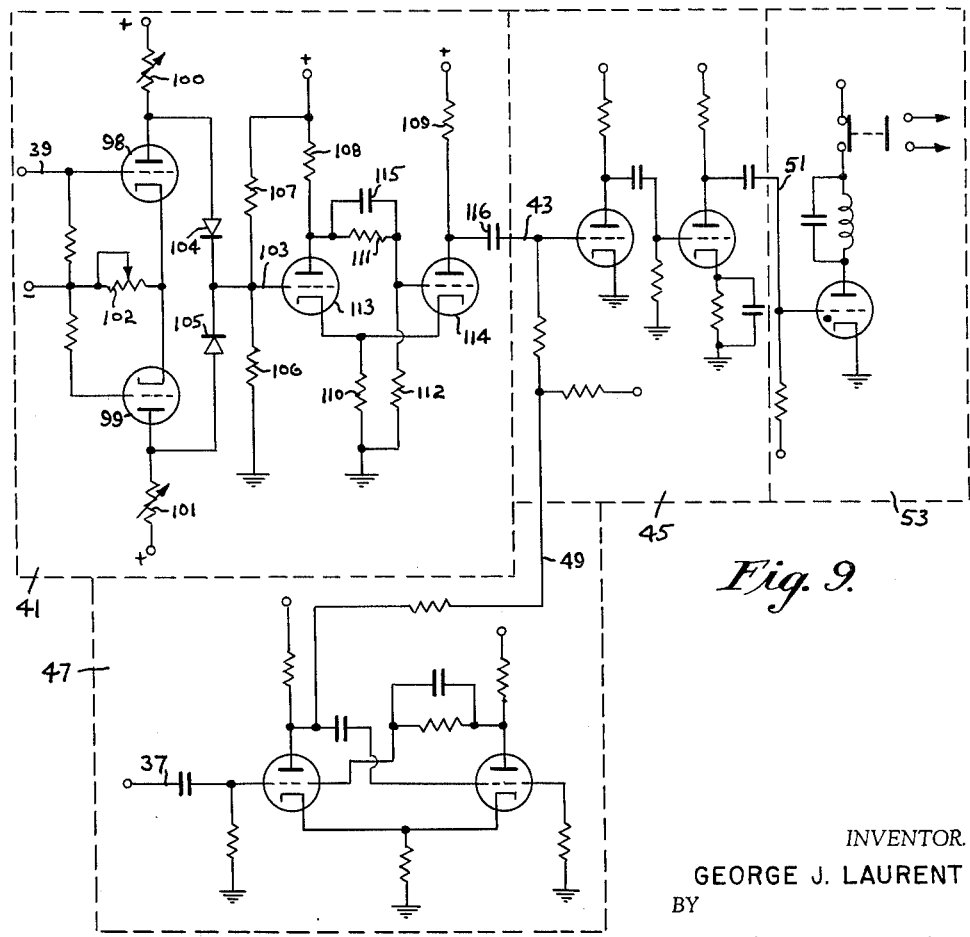

June 21, 1966  G. J. LAURENT  3,257,563
PHOTOSENSITIVE VARIABLE APERTURE SCANNING DEVICE
Filed Oct. 22, 1962  3 Sheets-Sheet 3

INVENTOR.
GEORGE J. LAURENT
BY
Walter B. Udell
ATTORNEY.

United States Patent Office 3,257,563
Patented June 21, 1966

3,257,563
PHOTOSENSITIVE VARIABLE APERTURE
SCANNING DEVICE
George J. Laurent, 95 E. Levering Mill Road,
Bala Cynwyd, Pa.
Filed Oct. 22, 1962, Ser. No. 232,079
17 Claims. (Cl. 250—219)

This invention relates generally to scanning devices adapted for surface inspection of web or sheet material for detecting flaws therein or deviations from a reference level by more than a predetermined amount. More particularly, this invention relates to scanning devices having a variable aperture property so that the scanner can examine the surface being viewed for a plurality of different types of defects, some being small area defects and others being large area defects. Alternatively, or additionally examination of the web or sheet material may be carried out with respect to different properties thereof, as for example reflectance and/or opacity to radiant energy of selected spectra.

In the past scanning systems of various types have been devised which although operative for their own purposes were nevertheless characterized by certain disadvantages. For example, one approach to the examination of a moving web or sheet of material has been to employ a large number of small size photo cells in fixed positions across the web with each photo cell being provided with its own amplifying apparatus and functioning to examine a fixed size area in a fixed location. Such a system is very costly and relatively inflexible. Another common approach has been the use of a rotating mirror or flying spot type of scanner utilizing a many faceted precision ground mirror structure. Other approaches have also been employed. However, the present invention is much more flexible than previously known devices in that it is capable of examining for a large number of different characteristics as the article to be examined passes a single inspection station. Thus, the scanning device according to the invention provides information which heretofore could only be obtained by employing a plurality of different devices each of which examined for a particular characteristic.

A primary object of this invention is to provide a novel scanning device for detecting defects in articles being examined by scanning the surface thereof with a plurality of means for detecting different types of undesired characteristics.

Another object of this invention is to provide a novel scanning device as aforesaid which incorporates thereinto a scanning aperture for examining the article to be inspected which is variable in size and in orientation to thereby render the scanning device responsive only to a particular kind of defect or one which is detectable only from a particular point of view.

Still another object of this invention is to provide a novel scanning device which provides qualitative differentiation between differing types of undesirable characteristics in the article being examined and which includes means for providing an indication of the specific type of defect which is detected.

A further object of the invention is to provide a novel variable aperture scanning device having the aforesaid characteristics in which the type, frequency and size of aperture variation may be quickly and easily changed to suit a change in the articles being examined.

The foregoing and other objects of the invention will become clear from a reading of the following specification in conjunction with an examination of the appended drawings, wherein:

FIGURE 1 is a logical block diagram of the scanning apparatus according to the invention;

FIGURE 2 illustrates in diagrammatic form the apparatus for scanning the article to be examined and the means for generating information and synchronizing signals;

FIGURE 3 illustrates in plan view a portion of the scanning apparatus of FIGURE 2 as would be seen when viewed along the line 3—3 thereof, the sectioned portions of FIGURE 2 being viewed as taken along the lines 2—2 of FIGURE 3;

FIGURES 4 and 5 are similar to the showing of FIGURE 3 but illustrate scanning apertures of different types suitable for other purposes;

Figure 7:
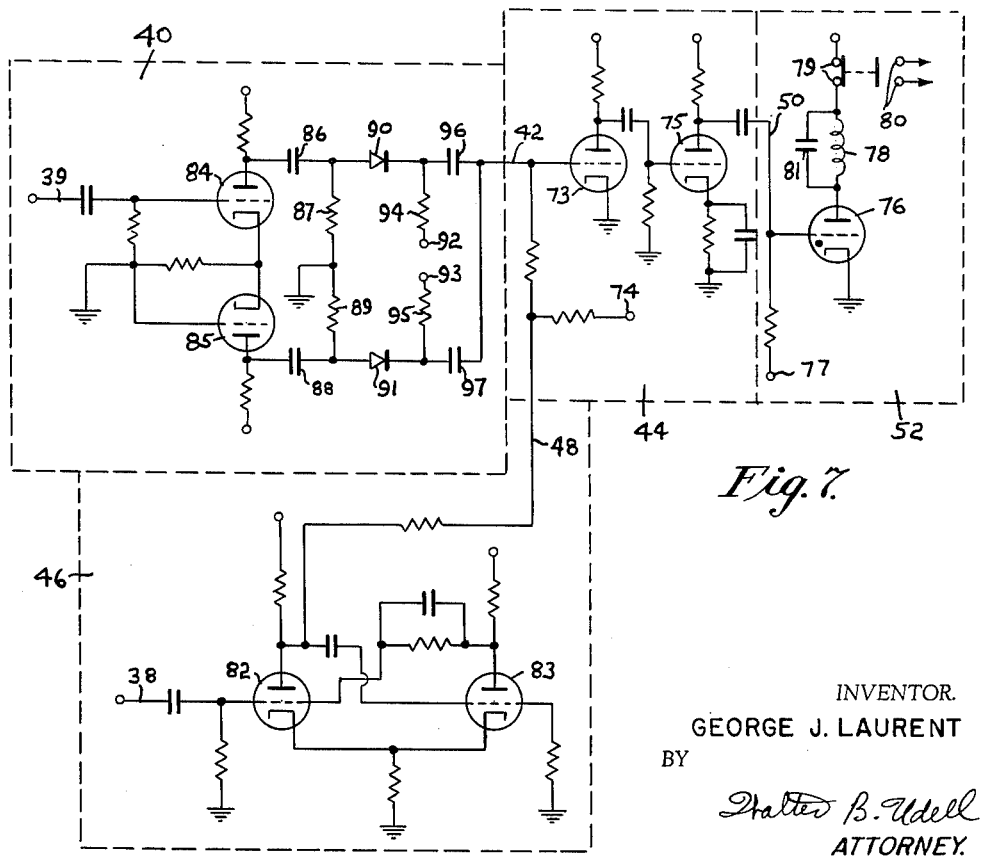
FIGURE 7 is a schematic diagram of electronic apparatus corresponding to specific blocks of the logical diagram of FIGURE 1.

FIGURE 8 is a diagrammatic showing of a scanning apparatus similar to that shown in FIGURE 2 but adapted for defect detection as determined by both the reflection and transmission properties of the article being inspected; and FIGURE 9 is an electrical schematic diagram similar to that shown in FIGURE 7 but which is adapted to detect a different type of undesired condition in the article being inspected.

In the several figures, like elements are denoted by like reference characters.

Examining first FIGURES 1, 2 and 3, there will be seen in FIGURE 2 a moving belt or web 20 illuminated by a source of radiant energy 21, such as a light source, the belt 20 being illuminated across its entire width and for a desired distance lengthwise encompassing the region which is observed by lens system 22. Disposed above the lens system 22 is a disc 23 rotatable by a drive means 24 and provided with a plurality of small apertures 25 and large apertures 26 disposed in interlaced fashion equiangularly about the disc with the small apertures 25 lying at a common radial distance from the center of the disc, which radial distance is greater than the common radial distance of the large apertures 26 from the disc center. Disposed above the disc 23 in fixed position relative to the lens system 22 is a mask 27 which is apertured to provide a field opening 28 through which the radiant energy photocell detector 29 may view any light coming from the belt 20 which passes through the lens 22 and one of the disc apertures 25 or 26 when the latter are disposed between the lens 22 and field opening 28 of the mask 27.

Since the belt 20 may be on the order of twenty inches in width, and since a single photocell 29 is utilized as a detector device, it is necessary that the lens system 22 be one which produces a demagnification so that the twenty inch belt width disposed in the object plane of the lens system 22 is focused for example to a one inch width at the image plane of the lens system 22 within which the apertured disc 23 rotates. The length of the field opening at 28 of the mask in the direction of running length of the belt 20 is determined by the aperture pattern of the disc 23, the field opening length required being merely that which permits the radiant energy detector 29 to view the entire aperture 25 or 26. It will of course be appreciated that due to the demagnification effect of the lens system 22 the full width of the belt 20 is scanned by an aperture of the disc 23 in an angular rotation of the disc sufficient to move the aperture through an arc having a one inch chord length. The diameter of the disc 23 can therefore be considerably less than the width of the belt 20, thus reducing the size of the overall scanning device and the rotating disc which must be controllably moved by the drive system 24. Material simplification in the drive system results.

The disc 23, which might typically have a diameter between eight inches and twelve inches, may therefore be operated at relatively high speed as compared to the velocity of motion of belt 20. This permits a certain degree of overlap or redundancy with regard to successive scans so that there will not be any uninspected surface lying between the strip viewed for example by one of the apertures 25 and that viewed by the next successive aperture 25. The existence of any such strip would of course correspond to an incomplete inspection because the examination carried out by the large aperture 26 which scans between the smaller apertures 25 is one which looks for a characteristic different from that searched for by the apertures 25, and while it would be possible that the strip inspected by aperture 26 would be free of defects detectable by this larger aperture, it does not necessarily follow that it would be free of defects observable by the smaller apertures 25.

In order to achieve a substantial uniformity of optical viewing over the twenty inch belt width it is necessary that the lens systems 22 actually have a field of view somewhat larger than this, as for example a field of perhaps thirty inch diameter. Since the entire field of view of the lens system 22 is imaged at the plane of the disc 23, the undersurface of the disc 23 will be illuminated with an area of light considerably larger than the field opening 28 in the mask 27, and some of this light will tend to spill over the disc edge in an upward direction. Other masks are utilized to prevent the extraneous light from reaching the photocell detector 29. Although such other masks are not illustrated in order to maintain clarity in the drawings, it will be appreciated that such masks could for example be located between the lens system 22 and the under side of the disc 23 or between the lens system 22 and the surface of the conveyor belt 20.

While the radiant energy source 21 provides signals to the scanning system of reflected light, this is not an inherent limitation in the system and transmitted light or other radiant energy may be just as readily employed in place of the reflected radiant energy source 21 by using a source such as that designated as 30 and illustrated in FIGURE 2. In fact, as will be subsequently seen, it is possible to carry out inspection by both reflected and transmitted radiation.

As also seen in FIGURES 2 and 3 positioned toward the right side of the apertured disc 23 is a synchronizing signal generator system comprising detectors 31 and 32 disposed beneath the disc 23 and facing upward to view the underside thereof, a mask 33 apertured as at 34 and 35 which is disposed immediately above the disc 23, and a light source 36 positioned above the mask 33 to direct light downward through both of the holes 34 and 35 simultaneously. The aperture 34 in mask 33 and light detector 31 are physically positioned so that light from the source 36 is transmitted to detector 31 when one of the disc apertures 26 rotates into registry with the aperture 34, the synchronizing system being peripherally shifted about the disc 23 relative to the viewing mask 27 so that a light pulse is received by detector 31 just after an aperture 26 has entered the field opening 28 of the mask 27. Similarly, the detector 32 receives a light pulse from source 36 just after an aperture 25 has entered the field of the mask 27, and this condition is illustrated in FIGURES 2 and 3 where it is observed that apertures 25 and 35 of the disc 23 and synchronizer mask 33 respectively are in alignment to permit light from source 36 to be transmitted therethrough to detector 32, another aperture 25 having just entered the field opening 28 of the viewing mask 27.

The synchronizing signal outputs from detectors 31 and 32 appear respectively on lines 37 and 38, whereas the scanning signal output from the detector photocell 29 appears on output line 39. It should be now understood that the scanning signals generated by small apertures 25 and large apertures 26 are all produced by the same detector 29 and appear on a common output line 39 in alternate sequence. Specific apparatus for separately processing the information from the different sized apertures is automatically selected and activated since it is specifically known by means of the identifying synchronizing signals generated by the detectors 31 and 32 that the information being processed is being produced from the scan of a small aperture 25 or a large aperture 26. The integration of the scanner of FIGURES 2 and 3 into a complete system is illustrated in the logical block diagram of FIGURE 1 to which reference should now be made.

The scanning apparatus per se and synchronizing signal generators previously described in connection with FIGURES 2 and 3 are represented in the logical block diagram of FIGURE 1 by the lefthand central box subdivided as shown into a signal generating box 29' corresponding to the photocell detector 29, the A phase and B phase synchronizing signal generators 32' and 31' respectively corresponding to the synchronizing signal apparatus including the detectors 31 and 32, and the synchronizing signal and scanning signal output lines 37, 38 and 39. The scan signal output line 39 is connected to the input of an A phase threshold circuit 40 and also to a B phase threshold circuit 41, these threshold circuits determining whether or not the amplitude of the signals received at their input are smaller or larger than a predetermined control level. If the received signals are less than the predetermined control level they are suppressed by the threshold circuit, but if the signals exceed the predetermined control level of either of the threshold circuits then the signal will be transmitted via output line 42 or 43 to A phase gate 44 or B phase gate 45.

In general, the A phase and B phase threshold circuits will respond differently to a given signal appearing on the line 39 since usually they will be examining for different types of signals corresponding to different kinds of defects in the articles being scanned. In the instant case this is observed from the fact that the A phase circuits are those associated with the small apertures 25 of rotatable disc 23 whereas the B phase circuits are those associated with the large apertures 26 of the rotatable disc, the correlation being shown in FIGURES 2 and 3. The synchronizing signals appearing on A phase synchronizing circuit output line 38 are routed to a gating signal generator 46 while the synchronizing signals appearing on B phase synchronizing output line 37 are routed to a gating signal generator 47, the gating signal generators in response thereto generating gating signals which are routed to A phase gate 44 and B phase gate 45 respectively by gate signal lines 48 and 49.

The gates 44 and 45 are coincidence devices which each require simultaneous receipt of signals from their associated threshold circuit and gate signal generator circuit in order to produce an output. For example, the A phase gate 44 requires the concurrence of a gating signal on its input line 48 and a signal on its threshold circuit input line 42 in order to give rise to a signal on its output line 50. Similarly, B phase gate 45 requires the coincidence of signals on its input lines 43 and 49 to produce an output signal on its output line at 51.

The appearance of a signal on A phase gated output line 50 actuates a controlled device 52 which designates the detection of the type of defects examined for by the phase portion of the scanning system, whereas an output signal appearing on B phase gated output line 51 causes the actuation of controlled device 53 designating the detection of a defect of the type examined for by the B phase portion of the scanning system. The A phase controlled device 52 and B phase controlled device 53 may be alarm circuits of one form or another to provide a visual and/or audible alarm, and/or may automatically initiate interruption of production or trigger correction devices for rectifying the detected defects, or effect rejection of the defective article or initiate any other desired type of action.

The system of FIGURE 1 is of course a selective system which specifically designates the type of defect which has been detected. If the type of detected defect is not important, but only the existence of a defect of some type, then the outputs from the threshold circuits 40 and 41 may be buffered together into a common alarm circuit. Alternatively, if it is desired to examine for more than two particular defects, the scanning disc 23 may be provided with a third and perhaps a fourth type of scanning aperture and additional synchronizing signal generators. This would require additional threshold circuits, gating signal generators and gates as shown in FIGURE 1. Since however this represents merely a parallel extension of the system illustrated in FIGURES 2 to 3 the description which follows relative to the two phase system illustrated will also suffice for an extension thereof to three or more phases.

Figure 6:
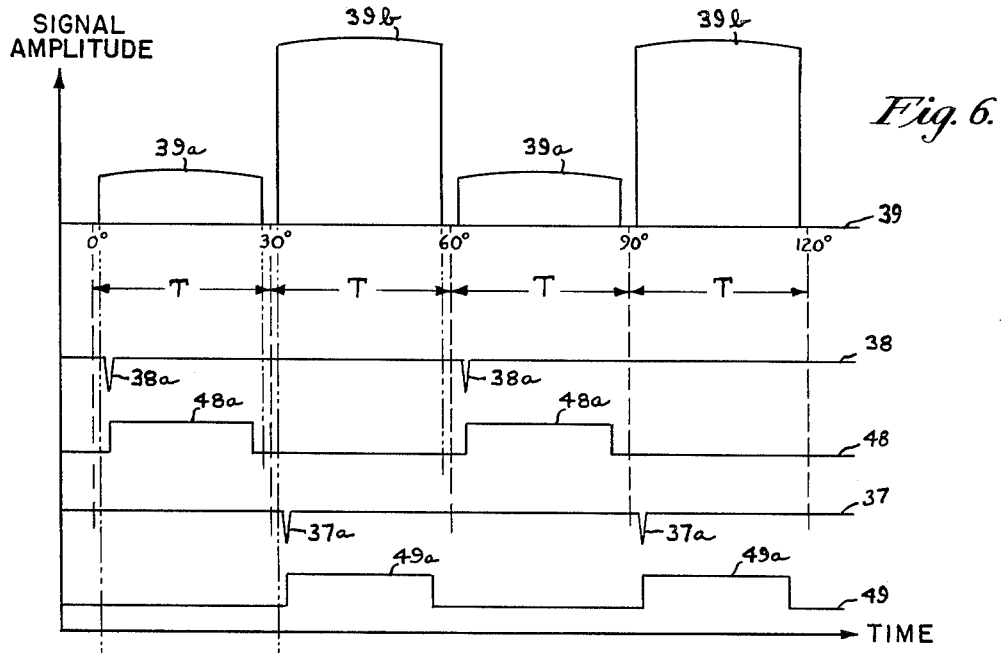
FIGURE 6 is a timing diagram of information and synchronizing signal waveforms and their timed relationship relative to one another.

Before describing the waveforms and circuitry of FIGURES 6, 7 and 9 which illustrate one possible way of implementing the logic of FIGURE 1, attention should be directed to the mechanical variations of the scanning system shown in FIGURES 4, 5 and 8 which demonstrate the general versatility of the scanning apparatus because systems employing these scanner variations, as well as that illustrated in FIGURES 2 and 3, all utilize the logic shown in FIGURE 1 and implemented in FIGURES 7 and 9. The scanning system of FIGURE 4 differs from that of FIGURE 3 in the relative relationship between the field openings of the masks and the disc apertures in that while the field opening 28 of mask 27 in FIGURE 3 encompasses the entire extent of scanning apertures 25 and 26 this is not the case in the scanner of FIGURE 4.

As shown in FIGURE 4, the mask 54 is provided with a pair of field openings 55 and 56, the latter being much narrower than the former and being of much greater length than width to basically define a slit. The disc 57 is provided with a plurality of angularly interlaced apertures in groups lying at radially different distances from the disc center, the larger apertures 58 being registrable with the larger field opening 55 while the smaller apertures 59 are registrable with the narrower field opening 56. It will be observed that the radial extent of the apertures 58 and 59 is sufficiently great so that the opposite ends of the apertures are never visible through their associated field openings. Consequently, the actual line of scan is rectilinear as contrasted to the circular arc of apertures 25 and 26 viewed by the scanning detector 29 as a consequence of the fact that the entire extent of the apertures 25 and 26 is visible through the field opening 28 of the mask 27. The rectilinear type of scan provided by the arrangement of FIGURE 4 is sometimes desired in order to achieve maximum sensitivity by utilizing a light source which is directly in line with the line inspected by the optical system, this being a feature of significance when the inspection is being carried out with transmitted light rather than reflected light and being readily achievable by utilization of a long light source such as a fluorescent tube.

The scanning disc of FIGURE 5 illustrates aperture variation of a fundamentally different nature than that as shown in FIGURES 3 and 4. The scanners of FIGURES 3 and 4 are similar in that they both disclose variation of aperture with regard to aperture size, whereas the aperture variation provided by the scanner of FIGURE 5 is not a variation of aperture size but provides variation with regard to point of view. Point of view scanning has application where for example the defect which is being examined for is of the long thin type such as a wrinkle in a sheet of fabric. Such wrinkles might for example be on the order of one-fiftieth of an inch in width and oriented in random fashion relative to the direction of scan. Examination for such wrinkles by utilization of a large size aperture is not practical because the average change in the viewed field with and without the wrinkle is relatively small and readily goes undetected unless an extremely high order of sensitivity is provided by the scanning circuit. Such extreme sensitivity is not only very costly to obtain, but is subject to the undesirable aspects attendant to such systems by markedly increasing the probability of giving false indications of defects due to normal variation in texture or weave of the fabric being examined.

Reliable detection of long thin defects of the type previously described can be achieved by utilizing a long thin scanning aperture which is angularly variable so that at some position of the viewing aperture a substantial coincidence condition between the length of the aperture and the length of the defect is effected. If then the width of the aperture is larger than the width of the defect by a factor which allows registration of the defect with the aperture to produce a substantial percentage change in the light viewed through the aperture then a defect will be readily detectable. Additionally, it will be appreciated that if the system sensitivity is sufficient to reliably detect for example a 20% variation, and complete coincidence of the defect with the viewing slit would cause for example three times such a change, then it will be appreciated that complete coincidence is not required for detection, but that detection will occur within a range of angular deviation between the defect and the slit aperture. A continuous variation of slit orientation is not therefore required and effective examination is achievable by utilization of a succession of examining slits oriented at different discrete angles.

Such an inspection system is illustrated in the showing of FIGURE 5 wherein it will be observed that the scanning disc 60 is provided with a plurality of slit apertures 61 through 69 successively viewable through the field opening 70 of mask 71, the slit 61 being disposed on a radius of the disc 60. The slits 62 through 65 are disposed at successively increasing angles with respect to a radius in one sense while the slits 66 through 69 are similarly disposed with respect to a radius but in the opposite sense. The difference in angulation between each successive pair of slits is such that defects oriented at any angle therebetween will be detected when viewed by one or the other of the slits. It will of course be appreciated that the scanning disc of FIGURE 5 is not inherently limited to variable point of view scanning, but could also have associated therewith scanning apertures of other types to provide a multiphase scanning system as generally illustrated in the scanners of FIGURES 3 and 4. In systems of the type shown in FIGURES 4 and 5, the image plane of the lens system would generally be located midway between the plane of the disc and the plane of the mask.

While FIGURES 3, 4 and 5 illustrate a variability with regard to size of field scanning and point of view scanning, FIGURE 8 illustrates yet another type of scanning, namely, alternate scanning with reflected radiation and with transmitted radiation in interlaced fashion to provide A phase and B phase scanning as previously described. Comparison of FIGURE 8 with FIGURE 2 reveals that all of the elements of FIGURE 2 are also shown in FIGURE 8 and identified by the same reference characters with the addition of primes thereto. FIGURE 8 in addition incorporates a light baffle 72 to prevent light from source 21' from being cast upon the area illuminated by transmitted light from source 30' and, vice versa. The disc apertures may take any desired form, as for example illustrated in FIGURES 3, 4 and 5, or some desired combinations. The typical circuitry for use with the scanning systems illustrated in FIGURES 2 through 5 and 8 for implementing the logical block diagram of FIGURE 1 are illustrated in FIGURES 7 and 9 to which attention should be now directed.

FIGURES 7 and 9 are each subdivided into four sections enclosed in dashed line and designated by numbers corresponding to the logical blocks of FIGURE 1. For example, the threshold circuits 40 and 41 of FIGURE 1 are designated in FIGURES 7 and 9 respectively and are observed to include different circuitry, whereas the A phase and B phase gates 44 and 45, gating signal generators 46 and 47, and controlled devices 52 and 53 are observed to have identical circuitry in FIGURES 7 and 9. The difference in the threshold circuits 40 and 41 is for the purpose of illustrating respectively the detection of discretely positioned defects which generate relatively fast defect signals and those types of defects which produce a gradually shifting or relatively slowly changing defect signal.

It is to be understood that the threshold circuit 40 illustrated in FIGURE 7 could be used in place of the threshold circuit 41 of FIGURE 9 if both A phase and B phase defects being examined for are of the type which produce relatively fast changing signals, and similarly the threshold circuit 41 of FIGURE 9 could be used in FIGURE 7 in lieu of the threshold circuit 40 under circumstances where the defects being examined for are both of the type which produce slowly changing signals. Since FIGURES 7 and 9 differ only in the threshold circuit associated therewith, the general operation of the circuitry will be described in connection with FIGURE 7 and the waveforms of FIGURE 6, and the threshold circuit 41 of FIGURE 9 will thereafter be examined.

The gate 44 includes a gate tube 73 biased beyond cutoff by negative voltage coupled to its grid from a negative supply connected to terminal 74. In order to drive the gate tube 73 into conduction it is required to raise the grid voltage in a positive sense to a predetermined minimum value, and this is achievable by a coincidence of positive going signals at the grid of gate tube 73 received from lines 42 and 48, with the signals so received being of such amplitude that neither alone is sufficient to drive the gate tube 73 into conduction. When the gate tube 73 is driven into conduction, a negative pulse is transmitted to the grid of amplifier stage 75, in turn causing a large positive pulse to appear on output line 50.

The thyratron 76 of control device 52 is in a normally non-conducting state and the control grid thereof is biased negative from a source of negative potential connected to terminal 77. The large positive pulse on gated output line 50 overcomes the negative grid bias of the thyratron 76 and causes it to fire and energize the coil 78 of a relay. This in turn causes the opening of thyratron plate supply contacts 79, extinction of thyratron 76, and the closing of a set of contacts 80 to close a circuit and initiate whatever action is to be taken upon the detection of a defect. The capacitor 81 connected across the relay coil 78 maintains the relay in an energized state after the contacts 79 have been opened for the time interval required by the circuitry activated by closure of contacts 80. Since the triggering signal which appeared on the gated output line 50 is of a transient nature, the thyratron 76 will remain on-conducting when the contacts 79 are thereafter reclosed by drop out of relay 78.

The gating signal generator 46 is a monostable trigger circuit sometimes known as a delay flop which is characterized by one stable state and one astable state, the astable state being maintained for a predetermined fixed time interval immediately following the receipt of a trigger signal on line 38, the circuit thereafter returning to its stable state. The normal or stable condition of the trigger circuit is that in which the input tube 82 is conducting and tube 83 is non-conducting so that the potential on output line 48 is low. When a negative pulse appears on output line 38 of synchronizing detector 32 it cuts off the input tube 82 of the trigger circuit which causes the anode voltage to rise sharply and turn on tube 83. Turn-on of tube 83 causes its anode to drop sharply and deliver a negative pulse to the grid of input tube 82 to hold it in a cutoff state. The relatively positive potential at the anode of the input tube 82 is transmitted in stepped down magnitude via gate signal line 48 to the grid of the gate tube 73 to thereby raise the grid potential of the gate tube to a point where a threshold signal of appropriate amplitude received over line 42 can drive the gate tube 73 into conduction.

The gating signal on line 48 is designated in the timing diagram of FIGURE 6 as 48a, being produced by the negative pulse 38a on line 38, and continuing for a time duration determined by the time constant of the trigger circuit 46. The time duration of the gating signal 48a is observed in FIGURE 6 to be shorter than the duration of the signal 39a which appears on the scanning signal output line 39, and to appear later than the leading edge of signal 39a and terminate prior to the trailing edge of signal 39a. Similarly, the gating signal 49a produced by negative pulse 37a generated by synchronization detector 31 for the gating signal generator 47 of FIGURE 9 is also of shorter duration than the signal 39b on scanning signal output line 39, and also commences after the leading edge of 39b and terminates prior to the trailing edge of signal 39b. The reason for this is that the leading and trailing edges of signals 39a and 39b generate spurious signals which are indistinguishable to the threshold circuit from signals produced by defects being examined for. These leading and trailing edge signals, generated by the scanning apertures such as 25 and 26 when entering and leaving the viewing field, must therefore be rendered incapable of passing through the gate 44. This is effected in the aforedescribed manner by generating the gating signal 48a or 49a after the leading edge of signal 39a or 39b have passed, and terminating the gating signals 48a and 49a prior to the arrival of the trailing edge of signals 39a or 39b. The sharp rise and fall of the leading and trailing edges of signals 39a and 39b would cause false indication of a defect because the defects examined for by threshold circuit 40 are of the type which produce sharply changing waveforms which would be indistinguishable from the leading and trailing edges of signals 39a and 39b.

The threshold circuit 40 includes a pair of cathode coupled amplifiers 85 each of which has its anode coupled to a differentiating output circuit, the amplifier 84 driving the differentiator comprising capacitor 86 and resistor 87 whereas amplifier 85 drives the differentiator comprising capacitor 88 and resistor 89. The differentiated outputs are coupled to the anode of either diode 90 or diode 91 whose cathodes are respectively clamped at positive potentials transmitted thereto from terminals 92 and 93 via resistors 94 and 95. If the amplitude of the differentiated signals appearing at the anode of diode 90 or 91 is large enough to drive the anode positive relative to the cathode then a positive pulse will be transmitted through coupling capacitor 96 or 97 to the threshold circuit output line 42 and to the grid of the gate tube 73. If the amplitude of these transmitted pulses exceeds a predetermined amount then the gate tube 73 will be rendered conductive and the operation previously described in connection with the description of the gate 44 and control device 52 will take place. The threshold circuit thus provides a pre-set fixed reference signal against which the signals arriving on line 39 are compared.

As is clear from the circuitry of FIGURE 7 it is only positive-going differentiated pulses appearing on gate line 42 which are capable of actuating the gate circuit. Without amplifier 85 of the threshold circuit 40, the apparatus would respond only to defects which produce negative going signals on line 39 since positive going signals at that point would generate negative pulses in the anode circuit of amplifier 84. The provision of amplifier 85 renders the threshold circuit responsive to pulses of either polarity since positive going signals appearing on input line 39 will appear in the anode circuit of amplifier 85 as positive signals, and these signals may then be differentiated and passed to gating line 42 via coupling condenser 97 if they are of sufficient amplitude. Additionally, the threshold circuit 40 may be made asymmetrically sensitive to positive-going and to negative-going signals appearing on line 39 by making the positive potential at terminal 92 different from that at 93 to thereby require that the pulse produced by either amplifier 84 or 85 be larger than that produced by the other.

The threshold circuit 40 illustrated in FIGURE 7 is responsive only to defects which produce signals having a steep wave-front due to the presence of the differentiating circuits consisting of the resistors and capacitors 86 through 89. Where a slowly changing condition is to be detected it is necessary to utilize circuitry which will respond to slow speed signals. In some cases the signal differential denoting a defect condition may not become apparent until substantially a full scan is completed. A circuit responsive to relatively slow changes is illustrated in the threshold circuit 41 of FIGURE 9, the scanning signal line 39 being illustrated as direct coupled to the input grid of the cathode coupled amplifier pair 98 and 99, although capacitor coupling could be utilized in most cases since the scanning interval of any given aperture corresponds to a frequency rate substantially higher than D.C.

The anodes of the cathode coupled amplifiers 98 and 99 are respectively connected through variable resistors 100 and 101 to a source of positive potential and the cathodes are commonly returned through variable resistor 102 to a source of negative potential. With the anode resistors 100 and 101 of equal magnitude the anode potential and the amplification of the cathode coupled amplifiers is equal and variable by means of the cathode resistor 102. Asymmetric anode potential for the cathode coupled amplifiers is obtainable by different settings for the variable anode resistors 100 and 101, these anode potentials being set under normal signal conditions at desired levels always less positive than the potential on line 103 to which these anodes are coupled through diodes 104 and 105.

The potential on line 103 is established by the voltage divider consisting of resistors 106 and 107 series connected between ground and a source of positive potential. With the potential on line 103 of higher positive value than that at both of the anodes of cathode coupled amplifiers 98 and 99, the diodes 104 and 105 effect a disconnect function between line 103 and the anode circuits of the cathode coupled amplifiers. The resistors 106 and 107 form a part of the biasing network for a Schmitt trigger circuit, and these resistors together with anode resistors 108 and 109, common cathode resistor 110, and coupling resistors 111 and 112 determine the quiescent state of the trigger circuit tubes 113 and 114.

Since the gate 45 requires a positive pulse on its input line 43 it follows that trigger tube 114 must be in a normally conducting state and trigger tube 113 must be normally cut off. The circuit constants are then so chosen that with tube 114 conducting a sufficiently high voltage is developed across cathode resistor 110 to insure cut-off of trigger tube 113 whose grid is clamped at a substantially less positive potential by means of the biasing network formed by resistors 106 and 107. When the anode of either of the cathode coupled amplifiers 98 or 99 is driven sufficiently positive by signal on line 39 the diode 104 or 105 associated therewith will be rendered conductive and the higher anode potential will appear on line 103. When the line 103 potential is raised sufficiently trigger tube 113 will suddenly conduct, its anode will drop sharply in potential producing a negative pulse transmitted by capacitor 115 to the grid of trigger tube 114 resulting in sharp cut-off of the latter. The cut-off of trigger tube 114 causes its anode potential to rise sharply and thereby produce a positive going pulse which is transmitted to the gating circuit input line 43 via capacitor 116.

The cathode coupled amplifiers 98 and 99 produce bi-polar output signals at their respective anodes for a signal of a given polarity on line 39 since the trigger circuit responds only to positive going pulses on line 103 and it is desired that the system be responsive to signals which deviate by predetermined amounts from a desired reference level in both the positive and negative directions. One application of this arrangement would be when scanning was carried out with light transmitted through the article being examined in order to determine that a desired degree of translucency should not be departed from by more than predetermined amounts, which may be unequal, in the directions of opacity and transparency.

As earlier generally referred to, in some applications it may be desirable to position the field mask between the lens system and the surface of the conveyor belt. In particular it may be desirable to position the field mask only slightly above the conveyor surface. In such a case, for purposes of maximum definition the object plane of the lens system would be located substantially midway between the surface of the object being examined and the plane of the field mask.

Having now described my invention in connection with particularly illustrated embodiments thereof it will be understood that variations and modifications thereof may now occur from time to time to those persons normally skilled in the art without departing from the essential scope or spirit of my invention, and accordingly it is intended to claim the same broadly as well as specifically as indicated by the appended claims.

What is claimed as new and useful is:

1. Apparatus for examining an article to detect defects therein by exposing the article to a desired type of radiation and selectively monitoring the response of the article thereto, comprising in combination,
    (a) an inspection device including
        (1) a source of radiation for irradiating the article to be inspected,
        (2) a detector device effective responsive to receipt of radiation from said source transmitted thereto from the article being inspected to generate information signals in accordance with the quanta of radiation received,
        (3) means effective to allow only that radiation from said source to reach said detector which is transmitted to the detector from the article being inspected,
        (4) scanning means comprising at least two aperture conditions characterized by differences in size, shape or orientation disposed in the radiation transmission path between said detector and the article being inspected to selectively vary the field of view observed by the said detector device to thereby determine the normal quanta of radiation passed to the said detector,
    (b) means associated with said detector device for determining when the information signals generated by said detector deviate by more than a predetermined measure from a pre-set fixed reference signal normally generated with the particular aperture condition which at that instant determines the field of view observed by the said detector device.

2. The apparatus according to claim 1 wherein said scanning means comprises a member which is opaque to radiation from said source and which is formed with a plurality of separate radiation transparent viewing apertures of at least two different sizes, said viewing apertures being moved successively and non-coincidentally transversely through the radiation transmission path between said detector and the article being inspected.

3. The apparatus according to claim 1 wherein said scanning means comprises a member which is opaque to radiation from said source and which is formed with a plurality of separate radiation transparent viewing apertures, at least two of said viewing apertures being so positioned in said member that they may be moved successively and non-coincidentally transversely along different courses through the radiation transmission path between said detector and the article being inspected.

4. The apparatus as defined in claim 1 wherein said scanning means comprises a member which is opaque to radiation from said source and which is formed with a plurality of separate radiation transparent viewing apertures of at least two different sizes, said viewing apertures being moved successively and non-coincidentally transversely through the radiation transmission path between said detector and the article being inspected, and wherein the said means associated with said detector device as set forth in paragraph (b) comprises,
   (1) control means associated with said scanning means for generating control signals, said control means including aperture size detection means for determining the size of a viewing aperture when such aperture assumes a particular position relative to the aforesaid radiation transmission path and means for generating a specific control signal designating the size of an aperture in response to detection of an aperture by said aperture size detection means, and
   (2) processing means responsive to joint information and control signals from said detector device and said control means respectively operative to determine when the information signals deviate by more than a predetermined measure from a pre-set fixed reference signal normally generated with the particular aperture which corresponds to the control signal which at that instant is present.

5. The apparatus as defined in claim 1 wherein said scanning means comprises a member which is opaque to radiation from said source and which is formed with a plurality of separate radiation transparent viewing apertures, at least two of said viewing apertures being so positioned in said member that they may be moved successively and non-coincidentally transversely along different courses through the radiation transmission path between said detector and the article being inspected, and wherein the said means associated with said detector device as set forth in paragraph (b) comprises,
   (1) control means associated with said scanning means for generating control signals, said control means including aperture course detection means for detecting which course is being followed by a viewing aperture when such aperture assumes a particular position relative to the aforesaid radiation transmission path and means for generating a specific control signal designating the course of aperture motion in response to detection of such motion by said aperture course detection means, and
   (2) processing means responsive to joint information and control signals from said detector device and said control means respectively operative to determine when the information signals deviate by more than a predetermined measure from a pre-set fixed reference signal normally generated with the particular aperture which corresponds to the control signal which at that instant is present.

6. Apparatus for examining an article to detect defects therein by exposing the article to a desired type of radiation and selectively monitoring the response of the article thereto, comprising in combination,
   (a) an inspection device including
      (1) a source of radiation for irradiating the article to be inspected,
      (2) a detector device effective responsive to receipt of radiation from said source transmitted thereto from the article being inspected to generate information signals in accordance with the quanta of radiation received,
      (3) mask means effective to allow only that radiation from said source to reach said detector which is transmitted to the detector from the article being inspected,
      (4) a radiation opaque rotatable disc disposed with its plane oriented transversely to the radiation transmission path between said detector and the article being inspected, said disc being provided with at least two individual radiation transparent viewing apertures movable successively and non-coincidentally transversely through the radiation transmission path as said disc is rotated to thereby permit radiation from the article being inspected to be transmitted to said detector through successive ones of said apertures and generate said information signals, said at least two viewing apertures being characterized by a difference in size, shape or orientation,
   (b) control means associated with said rotatable disc for generating control signals which identify each viewing aperture as such aperture assumes a particular position relative to the said radiation transmission path,
   (c) processing means responsive to joint information and control signals from said detector device and said control means respectively operative to determine when the information signals deviate by more than a predetermined measure from a pre-set fixed reference signal normally generated with the particular aperture which corresponds to the control signal which at that instant is present.

7. The apparatus according to claim 6 wherein said rotatable disc viewing apertures are of at least two different sizes, and said control means includes means for generating control signals which specifically indentify the size of each aperture as aforesaid.

8. The apparatus according to claim 6 wherein different ones of said rotatable disc viewing apertures are positioned in said disc so that they move along different courses through the radiation transmission path, and said control means includes means for generating control signals which specifically identify the course of motion of each aperture.

9. The apparatus according to claim 6 wherein the field of view of the article being inspected that is observed by the said detector device through any of said disc viewing apertures at any given instant is substantially smaller than the cross-section of the radiation transmission path in the plane of the disc so that the disc aperture exposes different portions of the article being inspected to the view of the detector as the aperture moves across the radiation transmission path.

10. The apparatus according to claim 6 wherein said mask means includes a field mask having a field opening therethrough which defines the size and shape of the total field viewable by said detector, and said disc viewing apertures are each substantially smaller than the size of the field opening in said field mask, said apertures moving one at a time into coincidence with and through the field opening as the said disc rotates.

11. The apparatus according to claim 6 wherein said mask means includes a field mask having a field opening therethrough which defines the size and shape of the total field viewable by said detector, and said disc viewing apertures are each substantially smaller in one direction than the size of the field opening in said field mask while being larger in another direction than the size of the field opening, said apertures moving one at a time into coincidence with and through the field opening as the said disc rotates to thereby define a moving viewing field seen by the detector in which the field boundaries are determined in one direction by the field mask and in the other direction by the disc apertures.

12. The apparatus according to claim 6 wherein said mask means includes a field mask having a field opening therethrough which defines the size and shape of the total field viewable by said detector, and said disc viewing apertures are each substantially smaller than the size of the field opening in said field mask and are positioned in said disc so that they move along different courses through the radiation transmission path, said apertures moving one at a time into coincidence with and through the field opening as the said disc rotates and said control means includes means for generating control signals which specifically identify the course of motion of each aperture.

13. The apparatus according to claim 6 wherein said plurality of rotatable disc viewing apertures are equi-angularly spaced about the periphery of said disc and are divided into at least two interlaced groups with the apertures of one group positioned at a common radial distance from the disc center which is further than the common radial distance from the disc center of the apertures of the other group, and said control means includes means for generating control signals which specifically identify to which group each of said apertures belongs.

14. Apparatus for examining an article to detect defects therein by exposing the article to a desired type of radiation and selectively monitoring the response of the article thereto, comprising in combination,
(a) an inspection device including
(1) a source of radiation for irradiating the article to be inspected,
(2) a detector device effective responsive to receipt of radiation from said source transmitted thereto from the article being inspected to generate information signals in accordance with the quanta of radiation received,
(3) mask means effective to allow only that radiation from said source to reach said detector which is transmitted to the detector from the article being inspected,
(4) a radiation opaque rotatable disc disposed between said detector device and the article being inspected with its plane oriented transversely to the radiation transmission path between said detector and the article being inspected, said disc being provided with at least two individual radiation transparent viewing apertures movable successively and non-coincidentally transversely through the radiation transmission path as said disc is rotated to thereby permit radiation from the article being inspected to be transmitted to said detector through successive ones of said apertures and generate said information signals, said at least two viewing apertures being characterized by a difference in size, shape or orientation.

15. The apparatus according to claim 14 wherein the field of view of the article being inspected that is observed by the said detector device through any of said disc viewing apertures at any given instant is substantially smaller than the cross-section of the radiation transmission path in the plane of the disc so that the disc aperture exposes different portions of the article being inspected to the view of the detector as the aperture moves across the radiation transmission path.

16. The apparatus according to claim 14 wherein said mask means includes a field mask having a field opening therethrough which defines the size and shape of the total field viewable by said detector, and said disc viewing apertures are each substantially smaller than the size of the field opening in said field mask, said apertures moving one at a time into coincidence with and through the field opening as the said disc rotates.

17. The apparatus according to claim 14 wherein said mask means includes a field mask having a field opening therethrough which defines the size and shape of the total field viewable by said detector, and said disc viewing apertures are each substantially smaller in one direction than the size of the field opening in said field mask while being larger in another direction than the size of the field opening, said apertures moving one at a time into coincidence with and through the field opening as the said disc rotates to thereby define a moving viewing field seen by the detector in which the field boundaries are determined in one direction by the field mask and in the other direction by the disc apertures.

References Cited by the Examiner
UNITED STATES PATENTS

| | | | |
|---|---|---|---|
| 2,106,611 | 1/1938 | La Pierre | 250—219.12 X |
| 2,106,612 | 1/1938 | La Pierre et al. | 250—219.12 X |
| 2,196,893 | 4/1940 | Berry | 250—219.12 X |
| 2,850,645 | 9/1958 | Chilton et al. | 250—219 |
| 2,892,124 | 6/1959 | Rabinow | 250—233 X |
| 3,162,712 | 12/1964 | Ingber | 250—219 |

RALPH G. NILSON, *Primary Examiner.*
WALTER STOLWEIN, *Examiner.*